(12) United States Patent
Ohmi et al.

(10) Patent No.: US 6,801,554 B1
(45) Date of Patent: Oct. 5, 2004

(54) LASER OSCILLATING APPARATUS, EXPOSURE APPARATUS, AND DEVICE FABRICATION METHOD

(75) Inventors: Tadahiro Ohmi, 1-17-301, Komegafukuro 2-chome, Aoba-ku, Sendai-shi, Miyagi-ken (JP); Nobumasa Suzuki, Utsunomiya (JP); Hiroshi Ohsawa, Utsunomiya (JP); Nobuyoshi Tanaka, Tokyo (JP); Toshikuni Shinohara, Sendai (JP); Masaki Hirayama, Sendai (JP)

(73) Assignees: Canon Kabushiki Kaisha, Tokyo (JP); Tadahiro Ohmi, Miyagi-ken (JP)

( * ) Notice: Subject to any disclaimer, the term of this patent is extended or adjusted under 35 U.S.C. 154(b) by 0 days.

(21) Appl. No.: 09/531,958

(22) Filed: Mar. 21, 2000

(30) Foreign Application Priority Data

Mar. 26, 1999 (JP) .......................................... 11-084675

(51) Int. Cl.⁷ .............................. H01S 3/00; H01S 3/22
(52) U.S. Cl. ............................ 372/37; 372/55; 372/57; 372/58; 372/59
(58) Field of Search .............................. 372/55, 76, 37, 372/57, 58, 59, 82, 92

(56) References Cited

U.S. PATENT DOCUMENTS

| | | | |
|---|---|---|---|
| 4,513,424 A | 4/1985 | Waynant et al. | 372/68 |
| 5,224,117 A | 6/1993 | Krüger et al. | 372/82 |
| 5,379,317 A | 1/1995 | Bridges et al. | 372/64 |
| 6,331,994 B1 * | 12/2001 | Ohmi et al. | 372/82 |

FOREIGN PATENT DOCUMENTS

| | | |
|---|---|---|
| EP | 0 280 044 | 1/1988 |
| EP | 0 820 132 | 7/1997 |

* cited by examiner

*Primary Examiner*—Don Wong
*Assistant Examiner*—Armando Rodriguez
(74) *Attorney, Agent, or Firm*—Fitzpatrick, Cella, Harper & Scinto

(57) ABSTRACT

An excimer laser gas in a laser tube 2 is excited by a microwave introduced from a waveguide 1, and electric field concentration occurs in a slit-shaped gap 3 provided in a plate member 11c, causing plasma discharge. Then the phase of plasma light is regulated and the light is resonated, to cause excimer laser light. This construction realizes plasma excitation entirely uniform along a lengthwise direction of laser light emission, and enables uniform laser light emission with minimum energy loss.

11 Claims, 9 Drawing Sheets

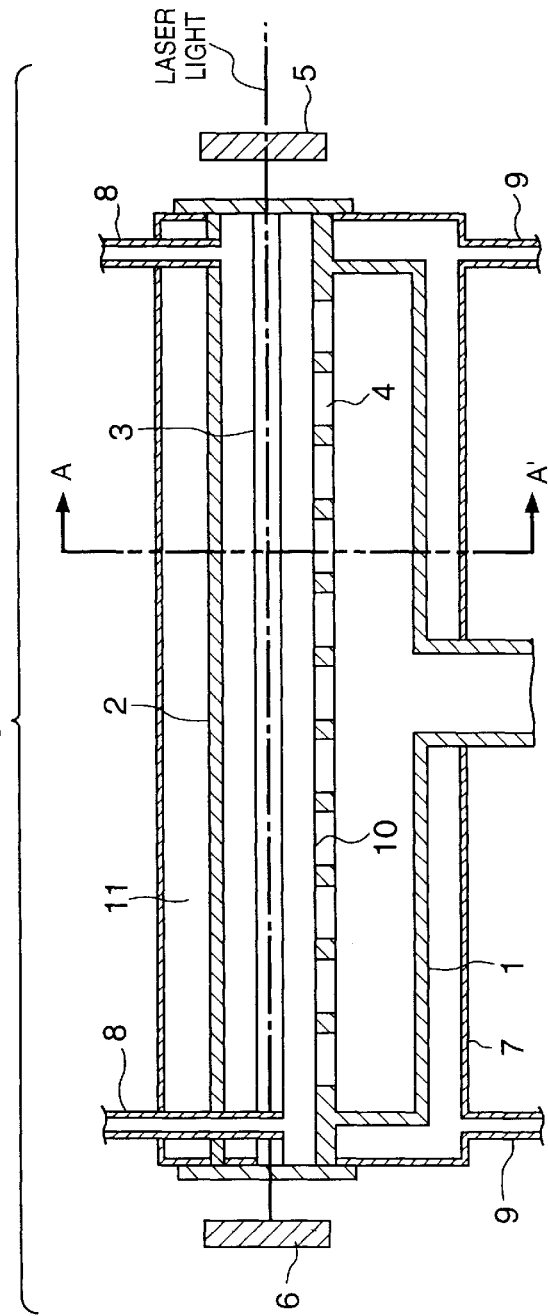
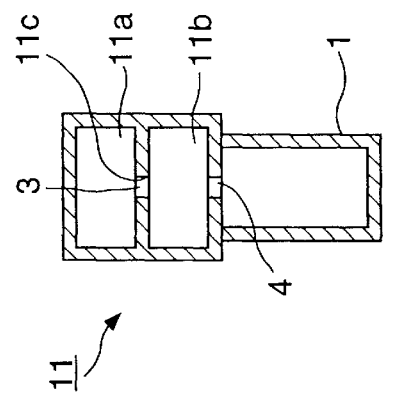

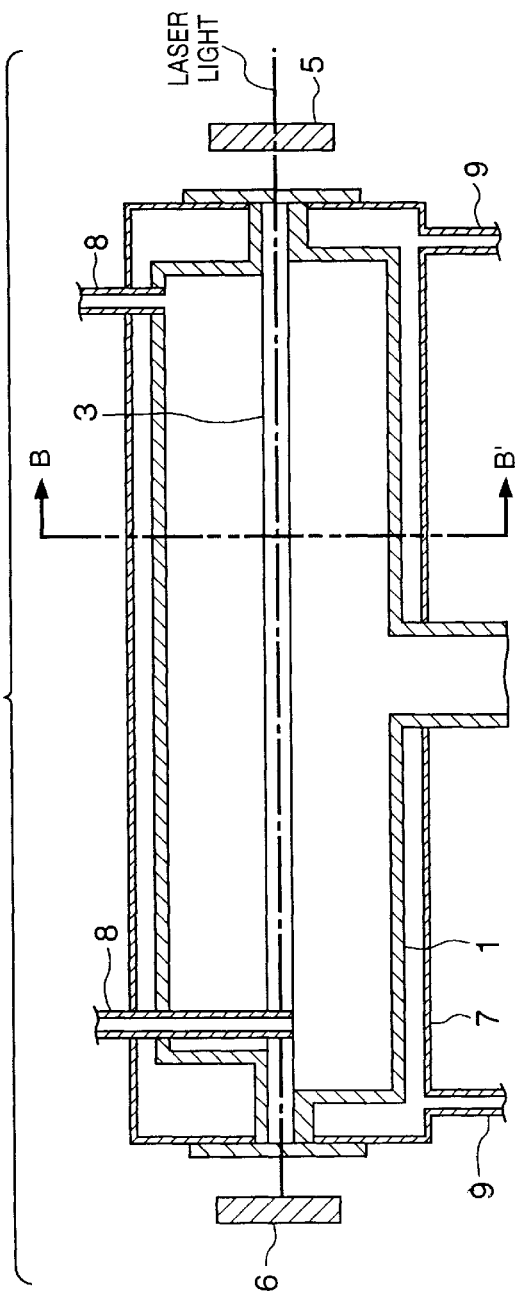
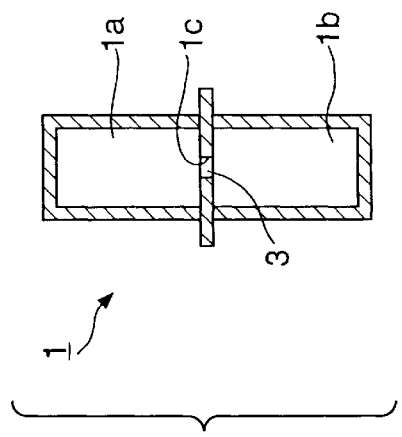
FIG. 4A
FIG. 4B

ACTION IN INPUT-SIDE WAVEGUIDE PLASMA

ACTION FROM PLASMA NON-EXCITED POSITIONS
STANDING WAVE IN RESONANCE WAVEGUIDE BY LEAKAGE TO WAVEGUIDE

INTERPOLATION IN PLASMA
EXCITATION SPACE USING STANDING WAVE IN RESONANCE WAVEGUIDE

SEMICONDUCTOR DEVICE FABRICATION FLOW

LASER OSCILLATING APPARATUS, EXPOSURE APPARATUS, AND DEVICE FABRICATION METHOD

FIELD OF THE INVENTION

The present invention relates to a laser oscillating apparatus which generates laser light by exciting a laser gas by an electromagnetic wave and resonating generated plasma light, and more particularly, to a laser oscillating apparatus using a microwave as an electromagnetic wave for laser gas excitation, an exposure apparatus having the laser oscillating apparatus, and a device fabrication method.

BACKGROUND OF THE INVENTION

Recently, a so-called excimer laser has attracted attention as the only high-output laser that oscillates in the ultraviolet region, and a wide range of applications of the excimer laser can be expected in the electronic industry, chemical industry, energy industry and the like, specifically, in the processing of and in chemical reactions with metals, resins, glass, ceramics, semiconductors and the like.

The principle function of an excimer laser oscillating device will be described. First, a laser gas such as Ar, Kr, Ne, He, $F_2$ and the like filled in a laser chamber is excited by electronic-beam emission, electric discharge or the like. At this time, the excited F atoms are combined with inert Kr and Ar atoms in a ground state, generating molecules KrF* and ArF* which exist only in an excited state. The molecules are called excimers. The excimers, which are unstable, immediately emit ultraviolet light and dissociate to the ground state. The excimer laser oscillating device utilizes the ultraviolet light emitted from the excimers. The device amplifies the ultraviolet light in an optical resonance device comprising a pair of reflection mirrors as light having a regulated phase, and outputs the light as laser light.

Upon excimer laser-light emission, as well as the above-described electronic beam and electric discharge, a microwave is used as a laser-gas excitation source. The microwave is an electromagnetic wave having an oscillation frequency within a range from several hundred MHz to several ten GHz. In this case, a microwave is introduced from a waveguide via a gap (slot) formed in a waveguide wall into a laser tube, to excite the laser gas in the laser tube into a plasma state.

However, even if the intensity distribution of the microwave emitted from the slot is uniform, in order to supply the microwave in a long space filling the length of the laser-light resonance device, it is necessary to form a slot array structure where plural slots are arrayed along the lengthwise direction of the resonance device. FIG. 9 shows this structure. Plural minute gaps (slots) 202 are formed at equal intervals in a waveguide wall 201. The microwaves are emitted from the minute gaps (slots) 202. In FIG. 9, discharge space within the laser tube is omitted for the sake of convenience.

In use of the slot array structure, an area between adjacent slots 202 (a hatched elliptic portion in FIG. 9) is a microwave non-emitted area. Accordingly, when the laser gas existing in the discharge space is excited by the microwave, the intensity of the microwave has unevenness due to the existence of the microwave non-emitted area, which causes plasma discharge having nonuniform distribution.

SUMMARY OF THE INVENTION

The present invention has been proposed to solve the above-described conventional problems, and its object is to provide a laser oscillating apparatus which realizes entirely uniform plasma discharge along a lengthwise direction of a laser tube, and enables laser light emission with minimum energy loss, having a structure which can be very easily designed, a high-performance exposure apparatus having the laser oscillating apparatus, and a high-quality device fabrication method using the exposure apparatus.

According to the present invention, provided is a laser oscillating apparatus for exciting a laser gas by an electromagnetic wave and resonating generated plasma light so as to generate laser light, wherein a light emission portion of the plasma light is a slit-shaped gap formed along a lengthwise direction of a plate member provided above and away from an electromagnetic-wave emission source.

The laser oscillating apparatus further comprises a shielding structure having a shielding wall covering the electromagnetic-wave emission source, wherein the shielding structure is internally supplied with the laser gas, and an upper surface of the shielding structure is used as the plate member, and the gap is formed along the lengthwise direction of the plate member.

In the laser oscillating apparatus, the shielding structure comprises a pair of chambers communicating with each other via the gap.

In the laser oscillating apparatus, the electromagnetic-wave emission source is provided in each of the chambers.

In the laser oscillating apparatus, a waveguide comprising a pair of chambers internally supplied with laser gas is provided above and below the plate member via the gap, and the electromagnetic wave is generated in one of the chambers and is propagated to the other one of the chambers through the gap, to continuously cause the plasma light over the entire area along the lengthwise direction where the gap is formed.

In the laser oscillating apparatus, an end of one of the pair of chambers is shifted to that of the other one of the chambers by a predetermined distance.

In the laser oscillating apparatus, an opening of the electromagnetic-wave emission source is wider than the slit-shaped gap provided above the opening.

Further, according to another aspect of the present invention, provided is a laser oscillating apparatus for exciting a laser gas by an electromagnetic wave and resonating generated plasma light so as to generate laser light, comprising a waveguide comprising a pair of chambers each internally supplied with the laser gas, wherein the waveguide has a slit-shaped gap in a lengthwise direction, and the chambers communicate with each other via the gap, and wherein the electromagnetic wave is generated in one of the chambers and is propagated to the other one of the chambers through the gap, to continuously cause the plasma light over the entire area along the lengthwise direction where the gap is formed.

In the laser oscillating apparatus, an end of one of the pair of chambers is shifted to that of the other one of the chambers by a predetermined distance.

In another aspect of the present invention, in the laser oscillating apparatus, the laser gas is supplied in a flow direction orthogonal to a generation direction of the laser light and across the gap.

In the laser oscillating apparatus, the laser gas is supplied in a flow direction orthogonal to a generation direction of the laser light and across the gap.

In the laser oscillating apparatus, the electromagnetic wave is a microwave.

Further, according to the present invention, in the laser oscillating apparatus, the laser gas is at least one inert gas selected from Kr, Ar, Ne, and He or a gaseous mixture of the at least one inert gas and an $F_2$ gas.

Further, according to another aspect of the present invention, provided is an exposure apparatus comprising: the above laser oscillating apparatus as a light source that emits illumination light; a first optical unit that irradiates a reticle, where a predetermined pattern is formed, with the illumination light from the laser oscillating apparatus; and a second optical unit that irradiates an irradiated surface with the illumination light via the reticle, wherein the predetermined pattern on the reticle is projected on the irradiated surface upon exposure of the irradiated surface.

Further, according to another aspect of the present invention, provided is a device fabrication method comprising: a step of applying a photosensitive material to an irradiated surface; a step of exposing the irradiated surface coated with the photosensitive material via a predetermined pattern by using the above exposure apparatus; and a step of developing the photosensitive material exposed via the predetermined pattern.

In the device fabrication method, the irradiated surface is a wafer surface, and wherein a semiconductor device is formed on the wafer surface.

In the laser oscillating apparatus of the present invention, the electromagnetic-wave emission source and the plasma emission portion (slit-shaped slot) are separately defined, and can be independently designed. Accordingly, if the electromagnetic-wave emission source and the light emission portion are designed to be a predetermined distance away from each other, an electromagnetic wave emitted from the emission source has a plane wavefront near the emission portion, i.e., has an entirely approximately plane wavefront. Accordingly, in the emission portion, as the laser gas is excited by the electromagnetic wave having the approximately plane wavefront, plasma discharge uniform along the lengthwise direction is enabled, and uniform laser light emission can be realized.

The laser oscillating apparatus of the present invention has a waveguide comprising the pair of chambers above and below a slit-shaped gap formed along the lengthwise direction (laser light generation direction), and the gap functions as the electromagnetic-wave emission source and the plasma light emission portion. In this case, when the electromagnetic wave (microwave) is generated in one of the chambers, the electromagnetic wave exists in a standing wave state in the chamber, and in correspondence with the standing wave, plasma discharge is performed with especially large emission light quantity in a position corresponding to the antinode of the standing wave. At this time, in a position where the plasma density is low, i.e., a position corresponding to the wave node of the standing wave, the electromagnetic wave enters the other chamber through the gap. If the other chamber is designed to invert the distribution of the standing wave, plasma discharge is performed such that the plasma density becomes the highest in a position through which the electromagnetic wave is transmitted. That is, in this case, the plasma discharge from the other chamber is performed self-consistently such that a high density position interpolates a low density position in the former chamber. Accordingly, plasma light occurs continuously over the entire space (along the entire lengthwise direction), and uniform laser light emission can be realized.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2A is a cross-sectional view showing principal elements of an excimer laser oscillating apparatus according to the first embodiment;

FIG. 2B is a cross-sectional view cut long a line A–A' in FIG. 2A;

FIG. 4A is a cross-sectional view showing principal elements of the excimer laser oscillating apparatus according to a second embodiment of the present invention;

FIG. 4B is a cross-sectional view cut along a line B–B' in FIG. 4A;

DETAILED DESCRIPTION OF THE PREFERRED EMBODIMENTS

Preferred embodiments of the present invention will now be described in detail in accordance with the accompanying drawings.

First Embodiment

Hereinbelow, a first embodiment of the present invention will be described. In this embodiment, an excimer laser oscillating apparatus which emits so-called excimer laser light will be exemplified.

Since the present invention has a plasma discharge mechanism for laser oscillation as its principal constituent element, the basic construction of the plasma discharge mechanism will be described prior to description of the construction of the excimer laser oscillating apparatus.

Figure 1:
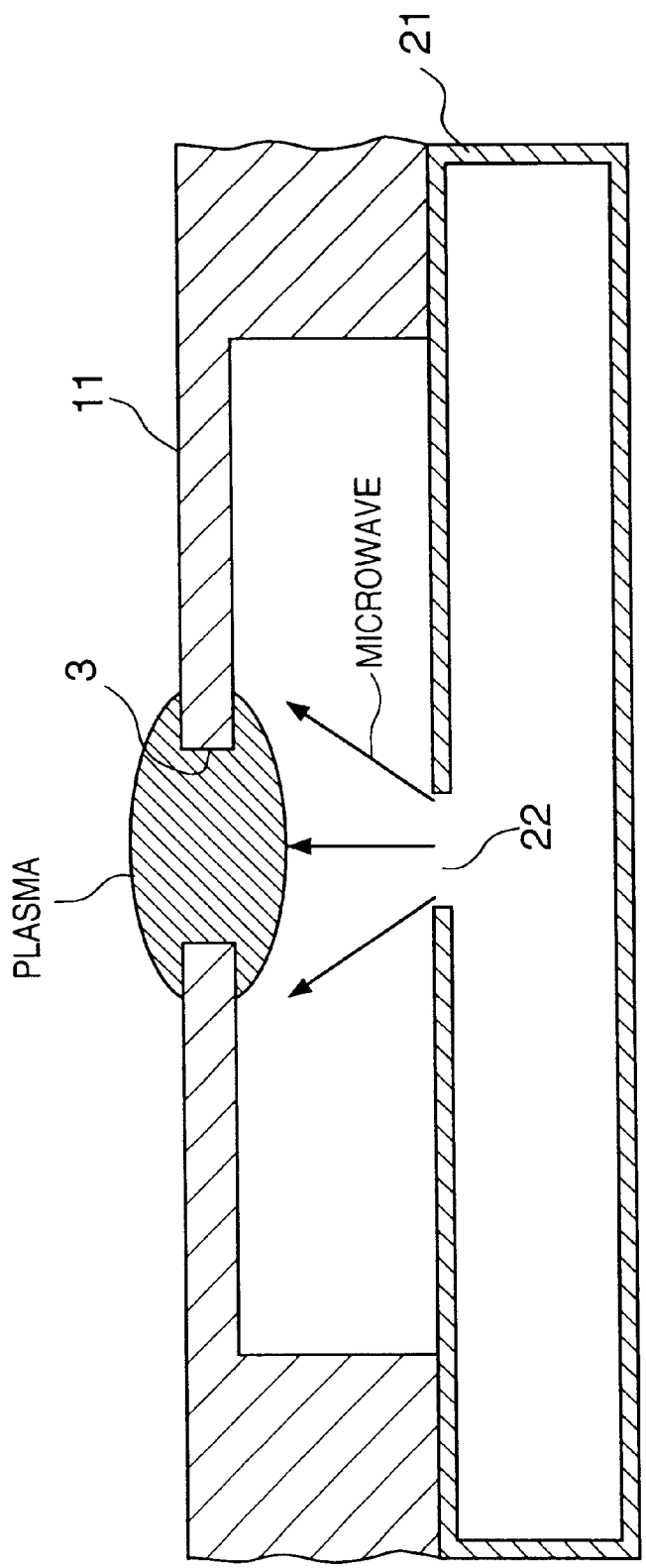
FIG. 1 is a cross-sectional view of a basic structure of a plasma discharge mechanism according to a first embodiment of the present invention.

FIG. 1 is a cross-sectional view of the basic structure of the plasma discharge mechanism according to the first embodiment of the present invention.

The plasma discharge mechanism has a microwave generation unit 21 including an emission source 22 as a microwave emission portion, and a shielding structure 11 having a shielding wall, covering the emission source 22, above the microwave generation unit 21. As the microwave generation unit 21, a waveguide is mainly employed. The shielding structure 11 has a slit-shaped gap 3 along a lengthwise direction on an upper surface of the structure.

A laser gas as a raw material for laser light generation is supplied to the outside of the microwave generation unit 21, i.e., a region including at least the shielding structure 11, and a microwave is emitted from the emission source 22 of the microwave generation unit 21. Then, electric field concentration occurs in the gap 3 positioned in front of (above) the emission source 22, and plasma discharge occurs in the gap 3.

In this case, if the emission source 22 and the gap 3 as a light emission portion are designed to be a predetermined-distance away from each other, even if the emission source 22 has a slot shape formed with predetermined pitch, the microwave emitted from the emission source 22, having a plane wavefront around the gap 3, has entirely approximately plane wavefront. Accordingly, as the laser gas is excited by the approximately-uniform plane wavefront microwave in the gap 3, plasma discharge, uniform along a lengthwise direction of the gap 3, can be made, and uniform laser light emission can be realized.

Note that the purpose of the plasma discharge mechanism is to perform plasma excitation, not around the emission source 22, but in the slit-shaped gap 3. Accordingly, if the emission source 22 has a narrow, so-called slot shape, electric field concentration occurs in the emission source 22, thus causing light emission.

Accordingly, to avoid the above electric field concentration and light emission, it is necessary to prevent the electric field concentration in the emission source 22, i.e., to increase the slot width of the emission source 22. More specifically, in the relation between the slot width of the emission source 22 and the gap 3, it is preferable that the slot width is wide to suppress the electric field around the slot so that the electric field is lower than the electric field needed to start plasma discharge. Further, as a condition for prevention of electric discharge by electric field concentration around the slot and for electric discharge by electric field concentration in the slit-shaped gap 3, positioned away from and above the slot, the slot width is preferably equal to or wider than the slit-shaped gap 3. Considering this condition, preferably, the opening of the emission source 22 is a nearly-square rectangular shape, an elliptic shape or the like, rather than the slot shape. It is preferable that the emission source has an array structure where plural minute gaps having such shape are arrayed in a lengthwise direction.

The excimer laser oscillating apparatus of the present embodiment has the above-described plasma discharge mechanism as its constituent element. FIG. 2A is a cross-sectional view showing principal elements of the excimer laser oscillating apparatus of the present embodiment. More particularly, in FIG. 2A, the shielding structure 11 has a pair of chambers 11a and 11b, partitioned from each other by a plate member 11c, and communicating to each other via the gap 3 having a slit shape formed in the plate member 11c.

As shown in FIG. 2A (schematic cross-sectional view) and FIG. 2B (schematic cross-sectional view cut along an alternate long and short dashed line A–A' in FIG. 2A), the excimer laser oscillating apparatus has a laser tube 2 which emits laser light by resonating light emitted by excitation of excimer laser gas, a waveguide 1 to excite the excimer laser gas in the laser tube 2 into a plasma state, and a coolant container 7 having a coolant input/outlet port 9 for cooling the waveguide 1. The waveguide 1 corresponds to the microwave generation unit 21 (FIG. 1) in the above-described plasma discharge mechanism.

The excimer laser gas as a raw material for excimer laser light emission is at least one inert gas elected from Kr, Ar and Ne, He or a gaseous mixture of the above at least one inert gas and an $F_2$ gas. Among these gases, gases are appropriately selected and combined in accordance with a wavelength to be used. For example, in a case where laser light having a wavelength of 248 nm is generated, KrF is used as the excimer laser gas; in a case where laser light having a wavelength of 193 nm is generated, ArF is used as the excimer laser gas; in a case where laser light having a wavelength of 157 nm, $F_2$ is used as the excimer laser gas; in a case where laser light having a wavelength of 147 nm, $Kr_2$ is used as the excimer laser gas; in a case where laser light having a wavelength of 134 nm, ArKr is used as the excimer laser gas; and in a case where laser light having a wavelength of 126 nm, $Ar_2$ is used as the excimer laser gas.

The laser tube 2 is provided with the shielding structure 11 having the chambers 11a and 11b partitioned by the plate member 11c, a laser gas inlet/outlet port 8 to introduce the excimer laser gas into the tube, and reflection members 5 and 6 at the respective ends. The reflection members 5 and 6 regulate the phase of the light caused by the plasma discharge, thus generating laser light.

The waveguide 1 supplies a microwave to the laser gas in the gas supply path structure 11. As illustrated in FIG. 2A, the waveguide 1 has plural slots 4. As described above, each slot 4 preferably has a nearly-square shape, an elliptic shape or the like to prevent electric field concentration as much as possible. When a microwave having a frequency of several hundred MHz to several ten GHz is introduced from the waveguide 1, the microwave is propagated within the waveguide 1 and emitted from the slots 4 to the outside of the waveguide 1. The emitted microwave is introduced into the laser tube. Then, the excimer laser gas in the laser tube 2 is excited by the introduced microwave. Then electric field concentration occurs in the slit-shaped gap 3, causing plasma discharge. The phase of the plasma light is regulated, then the plasma light is resonated, and the excimer laser light occurs.

According to the present embodiment, as the apparatus has the above-described plasma generation mechanism, microwave emission entirely uniform along the lengthwise direction of the laser tube 2 is realized, and uniform laser light emission with minimum energy loss is enabled. Further, since the slots 4 as the microwave emission source and the gap 3 as the plasma light emission portion are separately defined and can be designed independently, the mutual assembly positional relation can be adjusted. Thus a desired structure can be designed very easily and accurately.

Further, the microwave emission source is not limited to the slot array. The same advantage can be obtained by using a tapered waveguide or the like as long as it can supply the microwave uniformly along the lengthwise direction of the resonance device.

Modification to First Embodiment

Next, a modification to the first embodiment will be described. Note that the constituent elements and the like corresponding to those of the first embodiment have the same reference numerals, and the explanations of those elements will be omitted.

Figure 3:
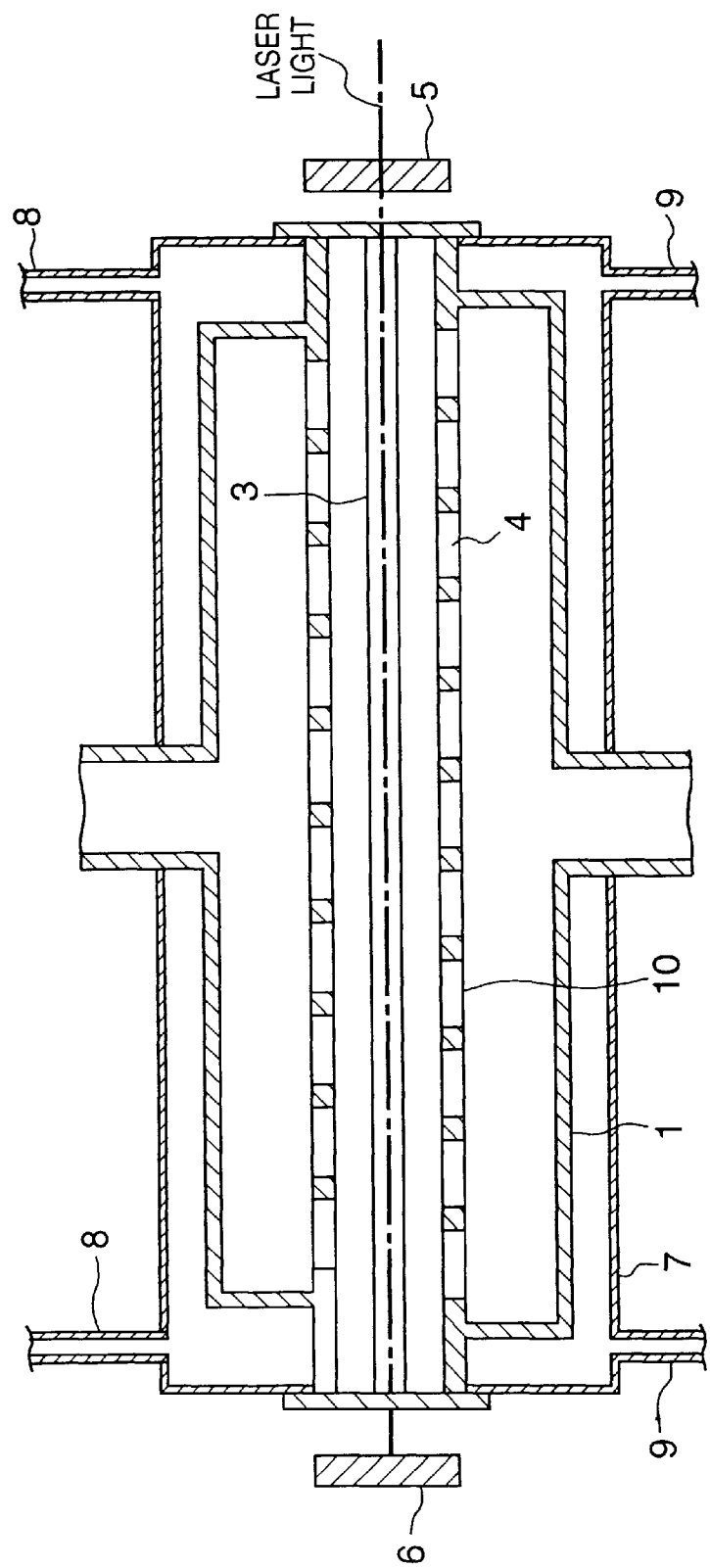
FIG. 3 is a cross-sectional view showing principal elements of the excimer laser oscillating apparatus according to a modification to the first embodiment.

In the present modification, as shown in FIG. 3 (cross-sectional view similar to FIG. 2A), the waveguide 1 is provided not only in the chamber 11b but also in the chamber 11a.

In this manner, the electric field concentration in the slit-shaped gap 3 can be more uniformly made by providing the pair of waveguides 1 corresponding to the respective chambers of the shielding structure 11. Accordingly, more uniform laser light emission can be performed.

As described above, in the excimer laser oscillating apparatus according to the first embodiment and the modification to the first embodiment, as the gap 3 itself can be used as laser light emission (plasma excitation) space, it is unnecessary to provide an insulating member to limit the excitation space around the gap. Thus the structure can be very easily designed. Further, microwave emission entirely uniform along the lengthwise direction of the laser tube 2 is realized, and uniform laser light emission with minimum energy loss is enabled.

Second Embodiment

Next, a second embodiment of the present invention will be described. In the second embodiment, the excimer laser oscillating apparatus corresponds to that of the first embodiment is discussed, however, the plasma generation mechanism of the second embodiment differs from that of the first embodiment. Note that constituent elements corresponding to those of the first embodiment have the same reference numerals and the explanations of the elements will be omitted.

As shown in FIG. 4A (schematic cross-sectional view) and FIG. 4B (schematic cross-sectional view cut along an alternate long and short dashed line B–B' in FIG. 4A), in the excimer laser oscillating apparatus, upper and lower waveguides 1a and 1b are provided via a plate member 1c. The plate member 1c has the slit-shaped gap 3, through which the waveguides 1a and 1b communicate with each other.

The significant feature of the excimer laser oscillating apparatus of the present embodiment is that the waveguides 1a and 1b, which are also used as a laser tube, correspond to the waveguide 1 in the first embodiment. In this case, the laser gas is introduced into both waveguides 1a and 1b, but the microwave is directly introduced from the outside into the waveguide 1b while the microwave is indirectly introduced from the waveguide 1b into the waveguide 1a, as described later. Note that the flow direction of the laser gas is orthogonal to the gap 3, from the waveguide 1a to the waveguide 1b.

Figure 5A:
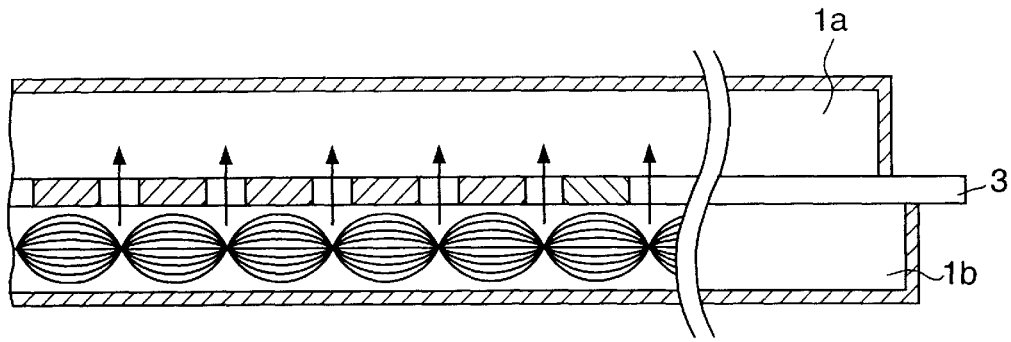
FIGS. 5A to 5C are cross-sectional views time-sequentially showing the principle of plasma excitation using the excimer laser oscillating apparatus according to the second embodiment.
Figure 5B:
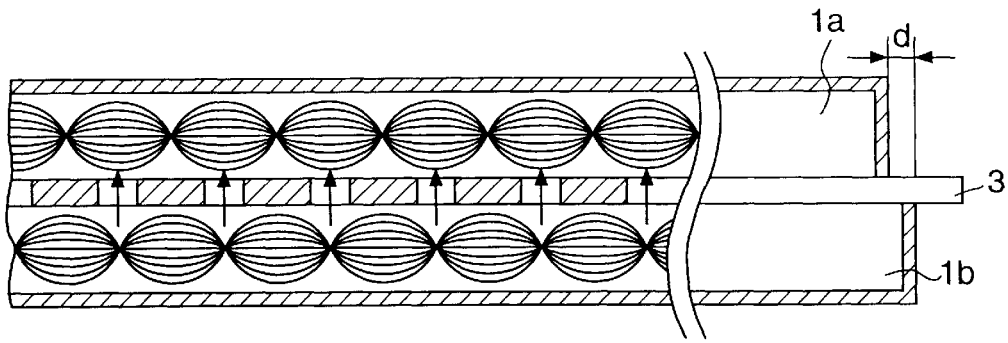
Figure 5C:
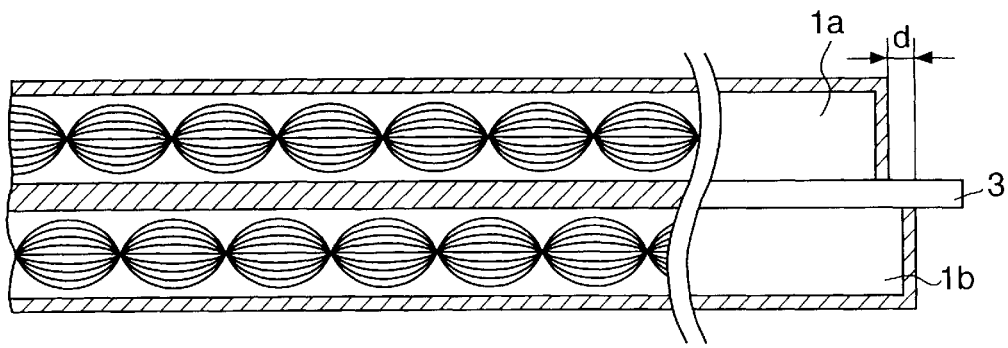

Next, the principle of plasma excitation by the excimer laser oscillating apparatus of the present embodiment will be described. FIGS. 5A to 5C are cross-sectional views time-sequentially showing the plasma excitation.

First, as shown in FIG. 5A, the microwave is generated and introduced into one of the chambers of the waveguide 1, i.e., the chamber 1b. As the microwave is propagated in the chamber 1b, an electric current flows through a waveguide wall. The microwave exists as a standing wave within the propagation space defined with the lengthwise direction of the chamber 1b, and the current, derived from the microwave, flowing through the waveguide wall, also exists as a standing wave. Note that as the standing wave form of the microwave is spatial and complicated, a standing wave in a general distributed constant line is used as an index in the figures.

At this time, emitted light is especially bright in a high density position of plasma excitation corresponding to the antinode of the standing wave. At this time, almost no light emission occurs in a low density position of plasma excitation corresponding to a wave node of the standing wave. The microwave passes through this position to enter the other chamber of the waveguide 1, i.e., the chamber 1a.

As shown in FIG. 5B, the microwave introduced into the chamber 1a, in which the laser gas is also introduced, exists as a standing wave in a manner such that the entrance position is the antinode of the standing wave.

Note that in FIGS. 5A and 5B, when the microwave enters the chamber 1a of the waveguide 1 through the gap 3, positions through which mainly the microwave passes are represented with arrows and white portions for the sake of convenience. However, the white portions are not provided with slots, but the white portions are merely parts of the slit-shaped gap 3.

As a result, as shown in FIG. 5C, in the chamber 1a, plasma discharge occurs such that the maximum density is attained in the microwave entrance position from the chamber 1b. That is, in this case, the plasma discharge from the chamber 1a is performed self-consistently such that the high density position interpolates the low density position of the plasma discharge in the chamber 1b. Thus, plasma excitation continuously occurs over the entire area (entire area in the lengthwise direction) of the gap 3.

Note that as shown in FIGS. 5A to 5C, an end portion of the chamber 1a is shifted from that of the other chamber 1b by a predetermined distance d. More specifically, the distance d is, i.e., ¼ of the wavelength of the microwave in the tube. This arrangement interpolates shift of the respective standing waves in the chambers 1a and 1b by ¼ wavelength, as shown in FIGS. 5B and 5C, and further, ensures continuous plasma light emission over the entire area of the gap 3.

As described above, in the excimer laser oscillating apparatus according to the second embodiment, as the gap 3 itself can be used as the laser light emission (plasma excitation) space, it is not necessary to provide an insulating member to limit the excitation space around the gap. Thus, the structure can be very easily designed. Further, plasma light emission entirely uniform along the lengthwise direction of the waveguide 1 (slit-shaped gap 3) is realized, and uniform laser light emission with minimum energy loss is enabled.

Third Embodiment

Figure 6:
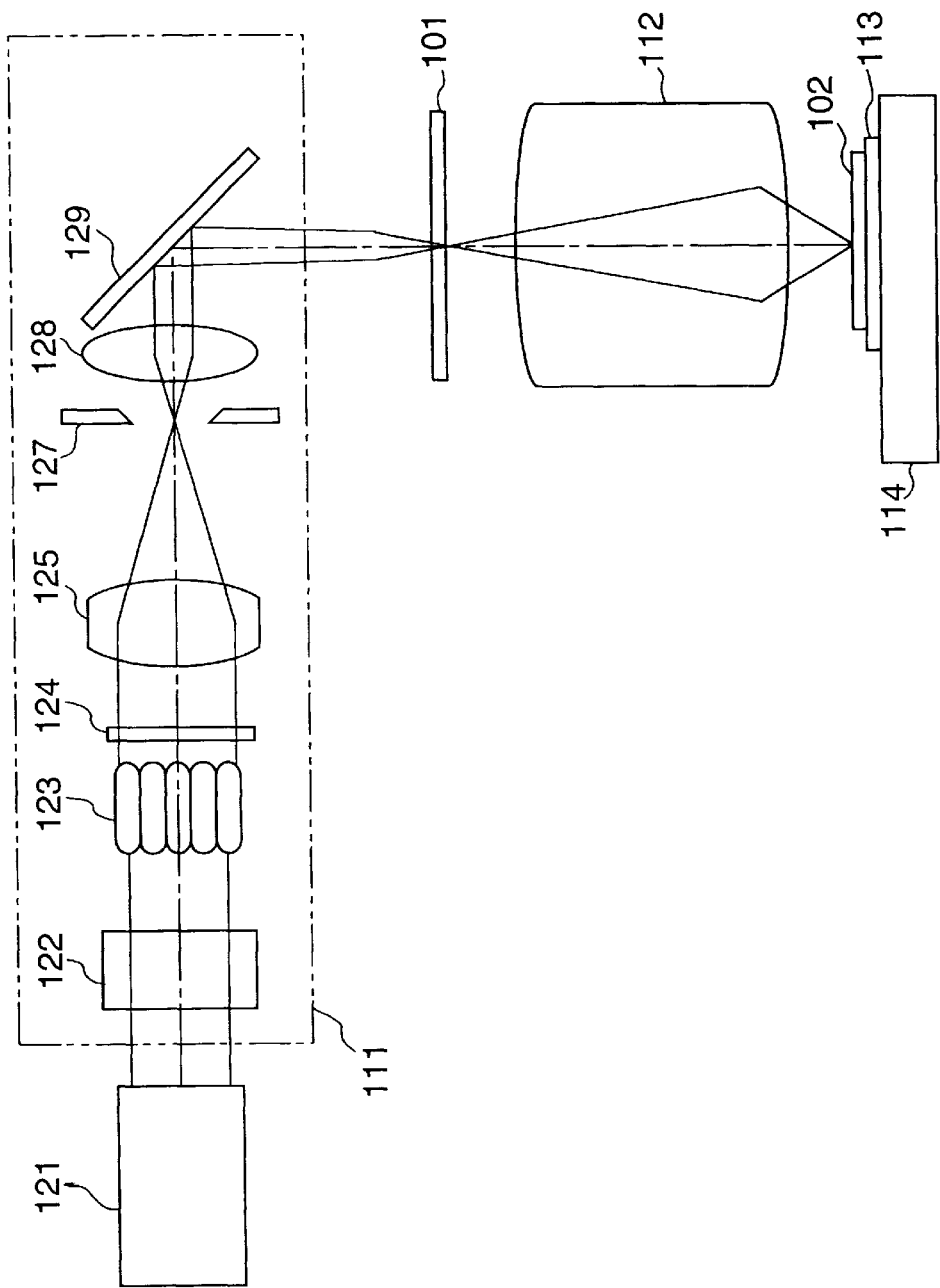
FIG. 6 is a schematic diagram showing an exposure apparatus according to a third embodiment of the present invention.

Next, a third embodiment of the present invention will be described. In the third embodiment, an exposure apparatus (hereinbelow, referred to as a "stepper" for the sake of convenience) having the excimer laser oscillating apparatus described in the first embodiment (and modification) and the second embodiment as a laser light source will be exemplified. FIG. 6 is a schematic diagram showing principal constituent elements of the stepper.

The stepper has an optical unit 111 which irradiates a reticle 101, on which a desired pattern is drawn, with illumination light, a projection optical unit 112 which inputs the illumination light via the reticle 101 and reduction-projects the pattern on the reticle 101 on the surface of a wafer 102, and a wafer chuck 113 on which the wafer 102 is placed and fixed, and a wafer stage 114 on which the wafer chuck 113 is fixed.

Note that as the reticle 101, a reflective type reticle as well as the transmitting type reticle (reticle 101) as shown in FIG. 6 can be used.

The optical unit 111 has an excimer laser oscillating apparatus 121 according to the first embodiment as a light source for emitting high-luminance excimer laser light as illumination light, a beam shape converting unit 122 which converts the illumination light from the light source 121 into a desired ray bundle shape, an optical integrator 123 having plural two-dimensionally arranged cylindrical and minute lenses, an aperture member 124, variable to an arbitrary aperture by a changing member (not shown), provided around the position of secondary light sources formed with the optical integrator 123, a condenser lens 125 which gathers the illumination light passed through the aperture member 124, a blind 127, having e.g. four variable blades, provided on a conjugation surface of the reticle 101, for arbitrarily determining the range of illumination on the surface of the reticle 101, an image formation lens 128 which projects the illumination light having the shape determined by the blind 127 onto the reticle 101, and a refracting mirror 129 which refracts the illumination light from the image formation lens 128 toward the reticle 101.

Next, an operation to reduction-project the pattern on the reticle 101 onto the surface of the wafer 102 using the stepper having the above construction will be described.

First, illumination light emitted from the light source 121 is converted to a predetermined shape by the beam shape converting unit 122, then directed to the optical integrator 123. At this time, plural secondary light sources are formed around the light emitting surface of the optical integrator 123. The illumination light from the secondary light sources are gathered by the condenser lens 125 via the aperture member 124, and defined to have the predetermined shape by the blind 127. Then the light passes through the image formation lens 128, and is reflected by the refracting mirror 129 toward the reticle 101. The light incident on the reticle 101 is then incident on the projection optical unit 112 through the pattern on the reticle 101, and the light passes through the projection optical unit 112. At this time, the pattern is reduced to a predetermined size, and projected on the surface of the wafer 102. Thus exposure is performed.

In the exposure apparatus of the present embodiment, as the excimer laser oscillating apparatus according to the first and second embodiments is employed as the laser light source, high-output and uniform excimer laser light can be emitted for a comparatively long period, and the wafer 102 can be quickly exposed with an accurate exposure amount.

Next, an example of a method for fabricating a semiconductor device by utilizing the projection exposure apparatus explained in FIG. 6 will be described.

Figure 7:
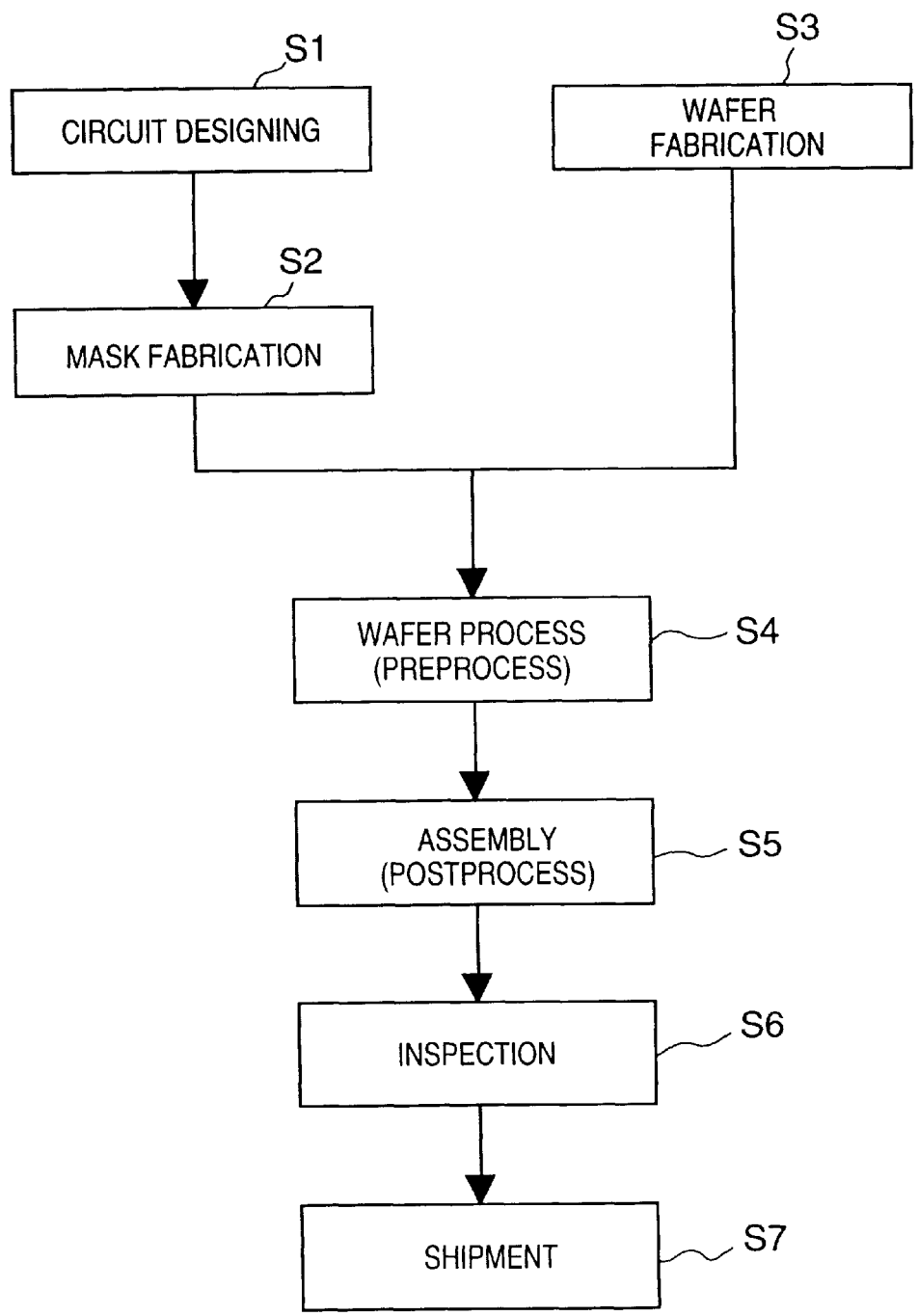
FIG. 7 is a flowchart showing a semiconductor-device fabrication process using the exposure apparatus according to the third embodiment.

FIG. 7 is a flowchart showing a process of fabricating a semiconductor device (a semiconductor chip such as an IC or an LSI, or a liquid crystal panel, a CCD or the like). First, at step 1 (circuit designing), a semiconductor device circuit is designed. At step 2 (mask fabrication), a mask where the designed circuit pattern is formed is made. On the other hand, at step 3 (wafer fabrication), a wafer is formed by using materials including silicon and the like. At step 4 (wafer process) which is referred to as a "preprocess", an actual circuit is formed on the wafer using the mask and wafer prepared as above, by a photolithography technique. At the next step 5 (assembly) which is referred to as a "postprocess", a semiconductor chip is fabricated using the wafer formed at step 4. The step 5 includes an assembly process (dicing and bonding), a packaging process (chip sealing) and the like. At step 6 (inspection), inspections including an operation check, an endurance test and the like are performed on the semiconductor device fabricated at step 5. Through these processes, the semiconductor device is completed, and shipped (step 7).

Figure 8:
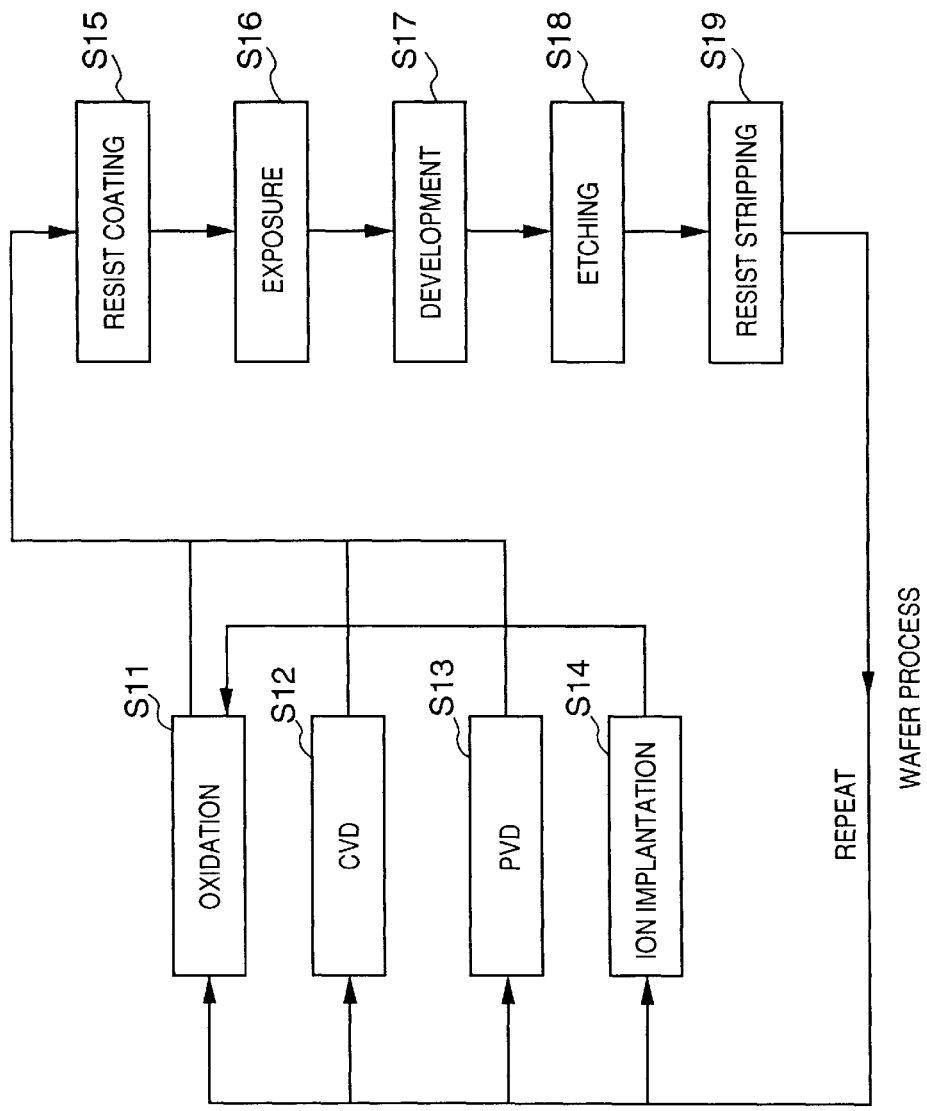
FIG. 8 is a flowchart showing a wafer process in FIG. 7.
Figure 9:
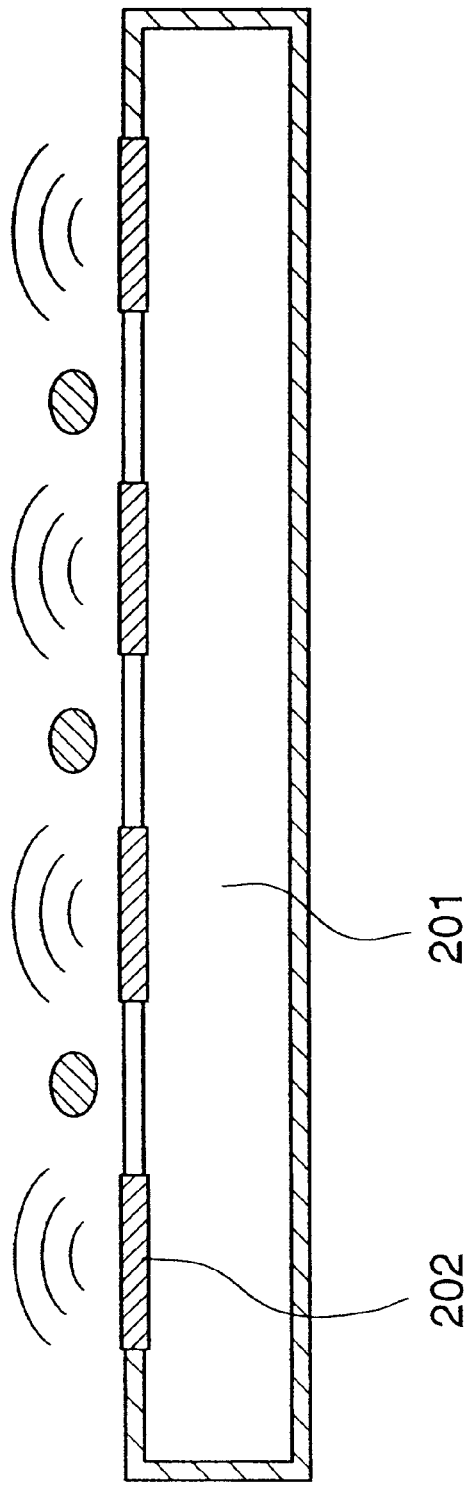
FIG. 9 is a schematic cross-sectional view of the conventional waveguide.

FIG. 8 is a flowchart showing the above wafer process (step 4) in detail. At step 11 (oxidation), a wafer surface is oxidated. At step 12 (CVD (Chemical Vapor Deposition)), a conductive film and an insulating film are deposited on the wafer surface by using vapor phase reaction. At step 13 (PVD (Physical Vapor Deposition)), a conductive film and an insulating film are deposited on the wafer surface by sputtering, vapor deposition or the like. At step 14 (ion implantation), ions are implanted into the wafer. At step 15 (resist coating), a photosensitive material is applied to the wafer. At step 16 (exposure), the circuit pattern of the mask is printed on the wafer by exposure by using the above-described projection exposure apparatus. At step 17 (development), the exposed wafer is developed. At step 18 (etching), other portions than the developed resist image are etched. At step 19 (resist stripping), the resist which has become unnecessary after the etching is stripped. These steps are repeated, and a multiple-layered circuit pattern is formed on the wafer.

This method enables fabrication of highly-integrated semiconductor device, which has not been fabricated without difficulty, with ease and an accurately high yield.

According to the present invention, plasma excitation uniform along a lengthwise direction of laser light emission can be realized, and uniform laser light emission with minimum energy loss can be achieved.

As many apparently widely different embodiments of the present invention can be made without departing from the spirit and scope thereof, it is to be understood that the invention is not limited to the specific embodiments thereof except as defined in the appended claims.

What is claimed is:

1. A laser oscillating apparatus comprising:
   a laser tube comprising a pair of waveguides which are divided from each other by a plate member and are connected via a slit-shaped gap formed on the plate member along a lengthwise direction of the waveguide, and
   a laser gas excited by electromagnetic waves supplied via the waveguides,
   wherein the width of the slit-shaped gap is larger than the thickness of the plate member,
   wherein plasma is in the slit-shaped gap, and
   wherein laser light is generated by resonating light emitted from the plasma.

2. The laser oscillating apparatus according to claim 1, wherein an end of one of said pair of waveguides is offset from the other one of said pair of waveguides by a predetermined distance.

3. The laser oscillating apparatus according to claim 1, wherein the laser gas is supplied in a flow direction from one of said pair of waveguides into the other of said pair of waveguides via the slit-shaped gap.

4. The laser oscillating apparatus according to claim 1, wherein the electromagnetic wave is a microwave.

5. The laser oscillating apparatus according to claim 1, wherein the laser gas is at least one inert gas selected from Kr, Ar, Ne and He or a gaseous mixture of the at least one inert gas and an $F_2$ gas.

6. An exposure apparatus comprising:
   a laser oscillating apparatus comprising a laser tube comprising a pair of waveguides which are connected via a slit-shaped gap formed along a lengthwise direction of the waveguides, and a laser gas excited by electromagnetic waves supplied via the waveguides, said laser oscillating apparatus being a light source that emits illumination light;

a first optical unit that irradiates a reticle, where a predetermined pattern is formed, with the illumination light from said laser oscillating apparatus; and a second optical unit that irradiates an irradiated surface with the illumination light via said reticle, wherein the predetermined pattern on said reticle is projected on said irradiated surface upon exposure of the irradiated surface, wherein the illumination light comprises laser light generated by resonating light emitted from plasma, and wherein the plasma is generated in the slit-shaped gap.

7. A device fabrication method comprising:

a step of applying a photosensitive material to an irradiated surface;

a step of exposing the irradiated surface coated with the photosensitive material via a predetermined pattern by using an exposure apparatus comprising a laser oscillating apparatus as a light source that emits illumination light, a first optical unit that irradiates a reticle, having a predetermined pattern formed thereon, with the illumination light from said laser oscillating apparatus, and a second optical unit that irradiates the irradiated surface with the illumination light via said reticle, the laser oscillating apparatus comprising a laser tube comprising a pair of waveguides which are connected by a slit-shaped gap formed along a lengthwise direction of the waveguides and a laser gas excited by electromagnetic waves supplied via the waveguides; and a step of developing the photosensitive material exposed via the predetermined pattern, wherein the predetermined pattern on said reticle is projected on the irradiated surface upon exposure of the irradiated surface, wherein the illumination light comprises laser light generated by resonating light emitted from plasma, and wherein the plasma is generated in the slit-shaped gap.

8. The laser oscillating apparatus according to claim 2, wherein the predetermined distance is ¼ of a wavelength of the electromagnetic waves in the waveguide.

9. The laser oscillating apparatus according to claim 1, wherein the electromagnetic waves are supplied to one of the pair of waveguides into the other one of the pair of waveguides via the slit-shaped gap.

10. The laser oscillating apparatus according to claim 1, wherein standing waves are formed by supplying the electromagnetic waves into the pair of waveguides.

11. The laser oscillating apparatus according the claim 10, wherein a phase of the standing waves is shifted by ¼ of the wavelength of the supplied electromagnetic waves in the respective waveguides.

* * * * *

UNITED STATES PATENT AND TRADEMARK OFFICE
CERTIFICATE OF CORRECTION

PATENT NO. : 6,801,554 B1
DATED : October 5, 2004
INVENTOR(S) : Ohmi et al.

It is certified that error appears in the above-identified patent and that said Letters Patent is hereby corrected as shown below:

Title page,
Item [75], Inventors, "1-17-301, Komegafukuro 2-chome, Aoba-ku, Sendai-shi, Miyagi-ken" should read -- Sendai --.
Item [73], Assignees, "Miyagi-ken" should read -- Sendai --.

Column 1,
Line 41, "ten" should read -- tens of --.

Column 6,
Line 36, "ten" should read -- tens of --.

Column 7,
Line 23, "corresponds" should read -- corresponding --; and

Column 12,
Line 22, "the" should read -- to --.

Signed and Sealed this

Thirteenth Day of June, 2006

JON W. DUDAS
*Director of the United States Patent and Trademark Office*